Aug. 16, 1949.  A. D. FORBES ET AL  2,479,334
ELECTRIC INDUCTION APPARATUS
Filed Nov. 19, 1945  2 Sheets-Sheet 1

WITNESSES:

INVENTORS
Allan D. Forbes &
William A. Siefert
BY
Franklin E. Hardy
ATTORNEY

Aug. 16, 1949.                A. D. FORBES ET AL                2,479,334
                         ELECTRIC INDUCTION APPARATUS
Filed Nov. 19, 1945                                           2 Sheets-Sheet 2

WITNESSES:                                           INVENTORS
                                                   Allan D. Forbes &
                                                   William A. Siefert
                                                         BY
                                                   Franklin E. Hardy
                                                       ATTORNEY Patented Aug. 16, 1949

2,479,334

UNITED STATES PATENT OFFICE 2,479,334

ELECTRIC INDUCTION APPARATUS

Allan D. Forbes and William A. Siefert, Sharon, Pa., assignors to Westinghouse Electric Corporation, East Pittsburgh, Pa., a corporation of Pennsylvania Application November 19, 1945, Serial No. 629,660

2 Claims. (Cl. 175—21)

Our invention relates to electrical induction apparatus, and particularly to coils or windings formed of insulated electrical conductors employed in such apparatus.

An object of the invention is to provide an electrical induction apparatus with an improved winding structure.

Another object of the invention is to provide an improved winding structure having graded layers of insulation between successive layers of winding turns of the electrical conductor that are wound layer upon layer about the axis of the winding and in which the winding possesses high dielectric strength, is economical to manufacture, and is economical of material and space required.

Further objects and advantages of the invention will be apparent from the following description of certain preferred embodiments thereof, reference being had to the accompanying drawing in which.

In certain applications of electrical induction apparatus, such as transformers employed for supplying relatively small amounts of electrical energy to thinly populated areas, it is desirable to provide distribution transformers of relatively low kilovolt ampere capacity that are small in size, light in weight and inexpensive to build and operate. Electrical energy may be supplied to such distribution transformers at a relatively high voltage (say 7200 volts to 12,470 volts, Y connected) and delivered from the transformer to the load at a relatively low voltage, such as 110 or 220 volts. The high voltage winding may be made of a relatively large number of turns of small diameter wire which is sufficient to carry the relatively small current required at the high voltage employed to deliver the small amount of power supplied to transformers of the character considered.

Because of the high voltage rating of such a winding, it is necessary to provide adequate insulation between successive layers of conductor winding turns, and it is also desirable to keep the size of the winding as small as possible.

In the manufacture of coils employed in such transformers, the space required for the insulation is of great importance since the smaller the space employed for the insulation the smaller will be the size of the coil and the smaller also will be the size of the other parts of the electrical apparatus employing the coil. Any saving in the space required for the insulation therefore produces a saving also in the overall size of the apparatus with a consequent reduction in the size and cost thereof. An arrangement of the winding turns and of the layers of insulating material positioned between the several layers of winding turns of the coil is hereby disclosed which saves considerable space over conventional winding coil structures.

In accordance with the invention, graded layers of insulating material are provided between successive layers of conductor winding turns of the high voltage winding. By arranging these parts in accordance with the teachings of the invention to provide graded layers of insulating material and by crimping the graded layers in accordance with the teachings of the invention, a very compact and electrically strong winding structure results.

Figure 1:
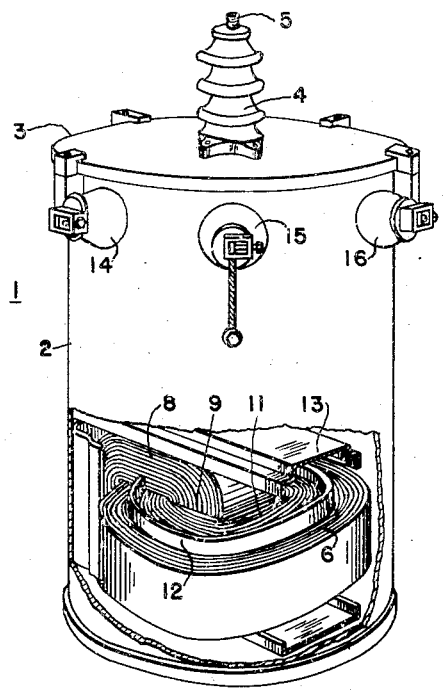
Figure 1 is a perspective view of an electrical transformer employing a winding structure constructed in accordance with the invention, parts being broken away to show the core and coil assembly within the transformer casing.
Figure 2:
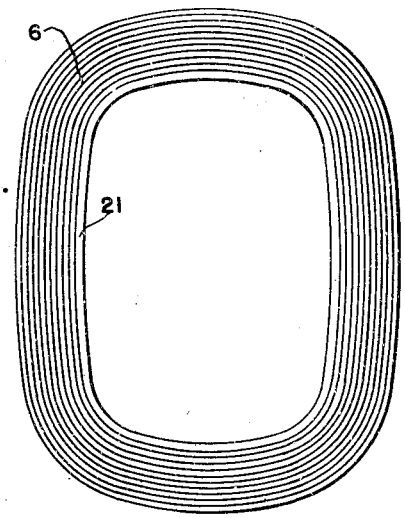
Fig. 2 is a plan view of the high voltage winding coil employed in the construction shown in Fig. 1.
Figure 3:
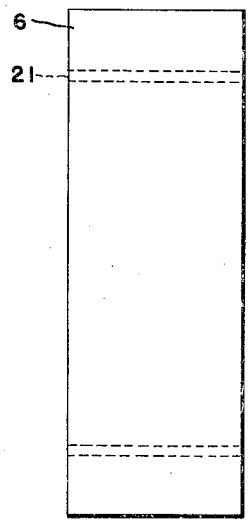
Fig. 3 is a side view of the high voltage winding coil shown in Fig. 1.

Referring to the drawing and particularly to Fig. 1 thereof, a distribution transformer 1 is provided having a casing or tank 2 and a cover 3 through which a high voltage bushing 4 extends carrying a stud 5 of conducting material, the outer end of which is adapted to be connected to a high voltage transmission circuit conductor for supplying electrical energy to the transformer, and the inner end of which is connected to one terminal of a high voltage winding 6 within the transformer casing. The other terminal of the high voltage winding 6 may be connected to a terminal grounded on the wall of the transformer tank 2, which is adapted to be connected to another conductor of the transmission line circuit or to a ground wire for grounding the transformer tank and the low voltage end of the winding.

In Fig. 1, a core and coil assembly is provided comprising a wound core 8 which may be of conventional construction and having one side 9 of the core loop serving as a winding leg about which is positioned a low voltage winding coil 11 and the high voltage winding coil 6 between which is positioned an insulating barrier 12. The core and coil assembly is mounted within a suitable frame 13, a portion of which is shown in Fig. 1. As shown in Fig. 1, the low voltage winding coil 11 and the high voltage winding coil 6 is generally rectangular in shape so as to better accommodate the rectangular-shaped winding leg 9 of the core structure. The low voltage winding may be provided with three bushings 14, 15 and 16, the middle one of which is grounded on the tank. The successive turns of the winding conductor of the high voltage winding are positioned in a series of layers wound about an insulating tube 21 as shown in Figs. 2, 4, 5 and 6.

In order to more clearly illustrate the relationship between the conductor turns and the layers of insulating material positioned therebetween, three layers, 22, 23 and 24 of winding turns only are shown, it being understood that the completed coil may have any required number of such layers. It will also be understood that the spacing of the conductor turns and the layers of insulation between the layers of turns is shown somewhat diagrammatically in Figs. 4, 5 and 6 for the purpose of more clearly illustrating the arrangement of the turns of the circuit conductor comprising the winding and the layers of insulation employed. The conductor employed may be a cotton-covered, copper conductor wound in a series of turns about the insulating tube 21, proceeding from right to left in the first layer 22 as illustrated in Figs. 4, 5 and 6, and then from left to right in the second layer 23, and again from right to left in the third layer 24, and so on throughout the number of layers of conductor winding turns required to complete the winding coil.

Figure 4:
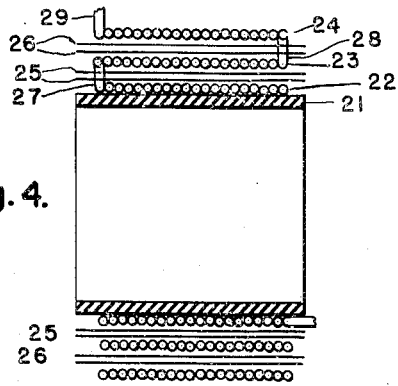
Figs. 4, 5 and 6 are cross-sectional views of portions of winding coils that are similar in general outline to that shown in Figs. 1, 2 and 3, illustrating three layers only of the circuit conductor together with different arrangements of the layers of insulating material positioned between the successive layers of the winding turns of the conductor.

Referring to Fig. 4, it is often found necessary to place one thick piece of insulation, or two or more thin pieces, between the successive layers of the winding conductor of the coil because of the high voltage between the layers. In Fig. 4, two layers of sheets of insulating material 25 are shown between the layers 22 and 23 of turns of the winding conductor and, similarly, two layers of insulating sheet material 26 are shown between the layers 23 and 24 of the winding turns. The crossover of the conductor from the first to the second layer of winding turns is shown at 27 at the left of the series of turns, the crossover between the layers 23 and 24 is shown at 28 at the right of the conductor turns, and the crossover between the layer 24 and the next succeeding layer is shown at 29, and this arrangement continues throughout the several layers of conductor turns advancing from one layer to the next layer alternately at the left and then at the right of the group of turns comprising the coil.

When the several layers of sheets of insulating material provided between successive layers of winding turns extend across the entire width of the coil between all of the turns in the successive layers, there is an excess amount of insulation at the end of the coil adjacent the crossover between the layers of winding turns. At this point, there is zero voltage stress between the two layers of conductor winding turns that are connected by the crossover. At the center of the coil the voltage stress between adjacent turns in the two layers is about half the voltage stress between adjacent turns in the same two layers at the ends of these layers opposite the crossover connection between the layers. It is not necessary therefore, from an electrical point of view, to employ the same amount of insulation between the successive layers adjacent the crossover between layers as at the opposite ends of these layers.

Figure 5:
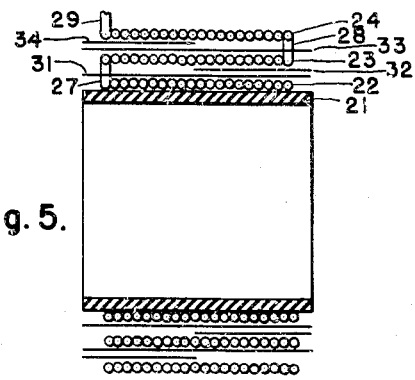
Figure 6:
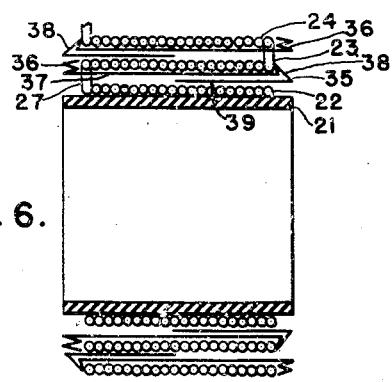

Referring to Fig. 5, a sheet 31 of insulating material extends between the layers 22 and 23 of winding turns entirely across all conductor turns in these layers of the winding and beyond the ends thereof, and a sheet of insulating material 32 extends from the right-hand edge of the sheet 31 inwardly between a portion of the winding turns in the layers 22 and 23. A similar arrangement of sheets 33 and 34 is provided between the layers 23 and 24 of the winding turns, the sheet 34 extending from the left edge of the sheet 33 inwardly between a portion only of the turns in the winding layers 23 and 24.

As shown, the left-hand edge of the sheet 32 and the right-hand edge of the sheet 34 terminate in the same plane at right angles to the axis of the winding which, in the particular embodiment of the invention illustrated, is centrally of the length of the coil. This arrangement of the layers of insulating material reduces the insulation near the crossover between adjacent layers to one thickness of material as compared to two thicknesses of the same material between the opposite ends of these layers. In the space between the second and third layers of winding turns, the double insulation and the single insulation are reversed in position because the crossover between these layers is at the opposite ends thereof. This arrangement continues throughout the successive spaces between adjacent layers of winding turns since the crossover between the successive layers of turns alternates from the right to the left end of the layers as viewed in the drawing. The total thickness of insulation at any one end of the coil for all layers is the same as at the other end if an even number of layers is used and approximately the same when an odd number of layers is used. The coil thus builds up evenly on the two ends as the coil is wound.

It will be appreciated that the amount of grading along the length of the layers of winding turns may be selected as desired. For example, instead of providing two layers of insulating material at one end and one layer at the other, three layers or four layers of insulating material may be provided at one end reducing to one layer at the opposite end. If three layers of sheets of insulation are provided, the inner edges of these sheets will terminate at successive thirds of the length of the layers while if four layers of insulating material are provided, the inner edges will terminate at successive fourths of the length of the layers of winding turns. It will follow that the number of layers of sheets of insulating material in two successive spaces between successive layers of winding turns will be the same for the entire length of the coil since the inner edges of the sheets of insulating material in one space between adjacent layers of winding turns are in the same plane at right angles to the axis of the winding as are the inner edges of the sheets of insulating material in the adjacent spaces between the series of winding turns comprising the coil. Thus, in proceeding from one end of the coil to the other if four layers of insulating material are used in the space between successive layers of winding turns, the number of layers in one space will be reduced from four to three at the same distance along the coil as the insulation in the adjacent space is increased from one to two, and similarly the layers of insulation will be graded in one space from three to two at the center of the coil, while in the next adjacent space it will be graded up from two to three. Continuing along the length of the coil, the number of layers in the first named space will be reduced from two to one at the same distance along the coil as the insulation in the adjacent space is increased from three to four.

This arrangement of the layers of sheets of insulating material extending from a location beyond the end of the winding turns, between the adjacent layers of the winding turns, and having certain layers of the sheets of insulating material extending between a portion only of the winding turns in the two adjacent layers of winding turns provides a greater thickness of insulating material between the turns of adjacent layers at the ends of the adjacent layers having the greatest voltage stress between them, and provides also a graded decrease in the number of layers of insulating material between the turns in the adjacent layers of winding turns at the ends of these layers where the voltage stress is less with a consequent lesser thickness thereof. By decreasing the thickness of the insulating material in the space between two adjacent layers of winding turns in steps along one or more planes at right angles to the axis of the winding of the coil, these planes being the same planes at which the thickness of the insulating layers in the adjacent spaces are increased, that is, by changing the graded thickness of the insulating material in the opposite sense along the same planes at right angles to the axis of the windings, the total thickness of insulation along the entire length of the coil remains the same.

Referring to Fig. 6, the sheets of insulating material between the layers of winding turns comprises insulating paper or similar material crimped so as to hold the turns in the adjacent layer in place. For example, a strip of paper 35 is provided and is crimped into several folds at one edge, as shown at 36, the sheet extending, as shown at 37, across the entire space between the layers 22 and 23 of conductor winding turns, the paper being crimped, as shown at 38, so as to form a re-entrant bend pointing inwardly toward the conductor turns, the outer edge of the sheet being bent under the remaining portion thereof, as shown at 39, and extending to the center of the coil to provide a double layer of insulation between the adjacent layers of conductor turns at the right of the center. The layers of insulating material provided between layers of conductor turns 23 and 24 are similar to those just described, except that the position of the insulating material is reversed so that the several folds 36 are at the right instead of the left and the re-entrant fold 38 is at the left.

Figure 7:
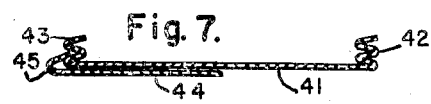
Figs. 7, 8 and 9 are cross-sectional views showing different arrangements of graded layer insulation adapted for use in accordance with the invention.
Figure 8:
Figure 9:

Other arrangements of the layers of insulating material are illustrated in Figs. 7, 8 and 9. In Fig. 7, for example, a sheet for insulating material 41 is shown having several folds of the material crimped at each edge thereof, as shown at 42 and 43, this layer of insulating material being adapted to extend along the entire length of the layer of conductor turns. Another layer of insulating material 44 is shown that is arranged to extend over a portion only of the winding turns between adjacent layers thereof, and is provided at one end with a crimped-over portion 45 which readily fits in the crimped portion 43 of the sheet 41 so that the two sheets 41 and 44 extend inwardly from the same location beyond the turns of the conductor. In Fig. 8, a similar layer of insulating material 41 extends the entire width of the length of the winding turns and a flat layer 46 is shown within the first fold of the crimped edge 43. In Fig. 9, the layer of insulating material 47 is shown below the sheet or layer 41 extending to the outer edge of the crimped portion thereof and is otherwise similar to the arrangement shown in Fig. 8. It will be appreciated that in the successive spaces between layers of winding turns proceeding outwardly as the coil is wound the sheets 44, 46 and 47, respectively, of Figs. 7, 8 and 9 will be positioned to extend inwardly from the opposite edges 43 or 42 of the sheet 41 so that the total thickness of the insulating sheets between successive layers will have the same general pattern as shown in Figs. 5 and 6, the greater insulating material being between points of greater voltage stress between adjacent layers of conductor turns.

It will be appreciated by one skilled in the art that modifications in the details of construction shown may be made within the spirit of our invention, and we do not wish to be limited otherwise than by the scope of the appended claims.

We claim as our invention:

1. In a transformer, a high tension spool type coil winding comprising a plurality of layers of a circuit conductor wound layer upon layer, each layer comprising a plurality of turns, the successive turns in one layer advancing along the winding layer in a direction opposite to the direction of the successive turns in the adjacent layers, a plurality of layers of sheets of insulating material disposed between said layers of winding turns, each layer of insulating material being of uniform width throughout its length, the different lengths being of different widths and extending from a location beyond the end of the layers of winding turns inwardly between adjacent layers of turns, at least one of said plurality of layers of said sheets extending across the whole length of the adjacent layers of turns and beyond the opposite end of the adjacent layers of turns so as to separate all of the turns in the two adjacent layers, said layer of insulating material being crimped at each edge to form a series of doubly re-entrant folds of the insulating material at each end of the layer of winding turns arranged to provide several thicknesses of the material positioned, the one above the other, closely adjacent to the ends of the winding turns on one side of the said layer of insulating material, at least one other of said plurality of layers of said sheets extending between a portion only of the winding turns in the adjacent layers of turns, certain, at least of the sheets extending between a portion only of the winding turns in the adjacent layers of turns extending inwardly from locations adjacent opposite ends of the coil winding and having an outer edge positioned within the folds of the crimped edge of a layer of insulating material that extends across the whole length of the adjacent layers of winding turns, the several layers of sheets of insulating material between successive layers of winding turns extending inwardly from locations adjacent opposite ends of the coil winding and those sheets that extend between a portion only of the winding turns terminating in the same plane at right angles to the axis of the winding so that the total thickness of insulation at any one portion along the length of the winding is substantially the same as at all other portions along the winding.

2. In a transformer, a high tension spool type coil winding comprising a plurality of layers of a circuit conductor wound layer upon layer, each layer comprising a plurality of turns, the successive turns in one layer advancing along the winding layer in a direction opposite to the direction of the successive turns in the adjacent layers, a plurality of layers of sheets of insulating material disposed between said layers of winding turns, each layer of insulating material being of uniform width throughout its lengths, the different lengths being of different widths and extending from a location beyond the end of the layers of winding turns inwardly between adjacent layers of turns, at least one of said plurality of layers of said sheets extending across the whole length of the adjacent layers of turns and beyond the opposite end of the adjacent layers of turns so as to separate all of the turns in the two adjacent layers, said layer of insulating material being crimped at one edge to form a series of folds arranged to provide several thicknesses of the material positioned the one above the other closely adjacent to the end of the layer of winding turns on one side of the said layer of insulating material, at least one other of said plurality of layers of said sheets extending between a portion only of the winding turns in the adjacent layers of turns, the several layers of sheets of insulating material between successive layers of winding turns extending inwardly from locations adjacent opposite ends of the coil winding, the sheets extending between a portion only of the winding turns in the adjacent layers of turns having a bent over edge along its outer edge that is adapted to interlock with the crimped edge of a layer of sheets of insulating material that extends across the whole length of the adjacent layers of winding turns so as to provide the greatest thickness of insulating material between the turns at the ends of the adjacent layers of the winding turns having the greatest voltage stress between them and a graded lesser thickness of insulating material between the turns at the ends of the adjacent layers of the winding turns having the least voltage stress between them.

ALLAN D. FORBES.
WILLIAM A. SIEFERT.

REFERENCES CITED

The following references are of record in the file of this patent:

UNITED STATES PATENTS

| Number | Name | Date |
|---|---|---|
| 755,229 | Klingelfuss | Mar. 22, 1904 |
| 1,011,791 | Honold | Dec. 12, 1911 |
| 1,118,446 | Roos | Nov. 24, 1914 |
| 1,450,362 | Gilinson | Apr. 3, 1923 |
| 1,469,469 | Wright | Oct. 2, 1923 |
| 1,864,331 | Whitesmith | June 21, 1932 |
| 2,246,159 | Work et al. | June 17, 1941 |
| 2,328,443 | Foster | Aug. 31, 1943 |

FOREIGN PATENTS

| Number | Country | Date |
|---|---|---|
| 442,711 | Great Britain | Feb. 13, 1936 |